United States Patent
Hishida et al.

(10) Patent No.: US 7,376,292 B2
(45) Date of Patent: May 20, 2008

(54) OPTICAL FIBER SENSOR, MANUFACTURING METHOD THEREOF, AND COLLISION DETECTION DEVICE

(75) Inventors: Yasuyuki Hishida, Hitachi (JP); Takahiro Saito, Hitachi (JP); Shigenori Kobayashi, Kira (JP); Motomi Iyoda, Seto (JP); Yukio Nakagawa, Toyota (JP)

(73) Assignees: Hitachi Cable, Ltd., Tokyo (JP); Denso Corporation, Kariya, Aichi-Pref. (JP); Toyoya Jidosha Kabushiki Kaisha, Toyota-Shi (JP)

(*) Notice: Subject to any disclaimer, the term of this patent is extended or adjusted under 35 U.S.C. 154(b) by 37 days.

(21) Appl. No.: 11/447,007

(22) Filed: Jun. 6, 2006

(65) Prior Publication Data
US 2006/0275013 A1     Dec. 7, 2006

(30) Foreign Application Priority Data
Jun. 7, 2005     (JP)     ............................. 2005-166836

(51) Int. Cl.
*G02B 6/02*     (2006.01)

(52) U.S. Cl. ................... 385/12; 427/163.1; 427/163.2
(58) Field of Classification Search ................... 385/12
See application file for complete search history.

(56) References Cited

U.S. PATENT DOCUMENTS

2003/0164755 A1     9/2003     Moritz et al.

FOREIGN PATENT DOCUMENTS

| JP | 64-42431 | 3/1989 |
| JP | 05-330401 | 12/1993 |
| JP | 2002-219108 | 8/2002 |
| WO | WO 00/32449 | 6/2000 |
| WO | WO 2004/033261 | 4/2004 |

*Primary Examiner*—Frank G. Font
*Assistant Examiner*—Mary El-Shammaa
(74) *Attorney, Agent, or Firm*—Antonelli, Terry, Stout & Kraus, LLP.

(57) ABSTRACT

An optical fiber sensor in which the insertion efficiency of a plastic fiber is improved, the potential danger of rupture of a mold member is decreased, the operation of the sensor in a low load area and the linearity of output of the sensor are improved. Plastic fiber for detection is inserted in insertion hole of molded member, and filler is filled in a gap between the plastic fiber for detection and the molded member.

1 Claim, 3 Drawing Sheets

(a)          (b)

OPTICAL FIBER SENSOR, MANUFACTURING METHOD THEREOF, AND COLLISION DETECTION DEVICE

BACKGROUND OF THE INVENTION

The present invention relates to an optical fiber sensor in which a plastic fiber for detection is inserted in an insertion hole of a molded member, a manufacturing method thereof, and a collision detection device for a vehicle in which the optical fiber sensor is used as a collision detection sensor.

In FS sensor (flexible pressure sensitive sensor) widely used as an electric load sensor (or, an impact detection sensor), a conductor for detection is inserted in a hole of a rubber tube. When the conductor is inserted in the hole of the rubber tube at manufacturing FS sensor, a compressed air is sent to the hole of the rubber tube, the size of which is smaller than outside diameter of the conductor, and the rubber tube be swollen. When the compressed air is evacuated after the conductor is inserted in the hole of the rubber tube under such a condition, the rubber tube shrinks and a gap between the rubber tube and the conductor disappears almost.

With regard to FS sensor, the rubber tube swells evenly when the compressed air is sent to the hole of the rubber tube because wall thickness of the rubber tube is thick and uniform. However, if the wall thickness of the rubber tube is not uniform, a thin part swells intensively, and it is likely to rupture at the end.

Because FS sensor is weak to electric noises and electromagnetic noises, an optical fiber sensor has come to be used instead of FS sensor, which has the same function as FS sensor and is very strong to electric noises and electromagnetic noises.

In a conventional optical fiber sensor, a stress-concentration plate with press punched holes is molded with a molded member, and a plastic fiber (POF) for detection is inserted in an insertion hole of the molded member.

In a method of manufacturing an optical fiber sensor, the compressed air is sent to the insertion hole of the molded member, and the POF is inserted in the insertion hole in its state, as is the case with the manufacturing method of FS sensor.

Such a conventional technique is disclosed, for example, in PCT international publication No. WO 00/32449.

SUMMARY OF THE INVENTION

Because the thickness of molded member is different according to the press-punched hole of a stress concentration plate in the optical fiber sensor. The part where the wall thickness is especially thin swells when the compressed air is sent to the insertion hole. Therefore, a crack occurs in the molded member when the pressure of the compressed air is high, and in the worst case, the molded member breaks.

Further, only when the POF is inserted in the insertion hole having the outside diameter than that of the POF, gap g is left between the molded member and the POF. As a result, the load is not transferred to the POF until the load that crushes gap g is applied to optical fiber sensor. This causes the sensor not to function in the low load area, and deteriorates the linearity of a sensor output.

Then, an object of the present invention is to provide an optical fiber sensor and a manufacturing method thereof, in which insertion efficiency of a plastic fiber is improved, a risk that a molded member breaks down is decreased, and operation of the sensor in the low load and linearity of output of the sensor are improved.

The present invention is made to achieve the above-mentioned object. The invention in one aspect resides in an optical fiber sensor in which a plastic fiber for detection is inserted in an insertion hole of a molded member. Here, filler is filled in a gap between the plastic fiber for detection and the molded member.

Preferably, in the optical fiber sensor, the filler comprises thermosetting resin or gel material.

In a further aspect, the invention resides in an optical fiber sensor in which a plastic fiber for detection is inserted in an insertion hole of a molded member. After blowing up said insertion hole by compressed air and inserting the plastic fiber for detection therein in its state, and the molded member is contacted to the plastic fiber for detection in a direction where load is applied by evacuating the compressed air.

Preferably, the section of the insertion hole is oval.

More preferably, the section of the insertion hole is oval, and a projecting slit is formed along the overall length of a long direction of the insertion hole.

More preferably, the optical fiber sensor is assembled to a fixed position, and said slit is crushed by assembly pressure when the sensor is assembled.

In a method of manufacturing an optical fiber sensor in which a plastic fiber for detection is inserted in an insertion hole of a molded member, when filler is filled from one end of the insertion hole to a gap between the molded member and the plastic fiber for detection after the plastic fiber for detection is inserted in the insertion hole, the gap is filled by sucking the filler from the other edge of the insertion hole.

Preferably, the filler is filled in the gap by press fitting.

In a further aspect, the invention resides in a method of manufacturing an optical fiber sensor in which a plastic fiber for detection is inserted in an insertion hole of a molded member. A gap between the molded member and the plastic fiber for detection is filled by inserting the plastic fiber in the insertion hole after thermosetting resin is applied on the plastic fiber for detection.

Preferably, thermosetting resin is heated and harden after inserting the plastic fiber for detection on which the thermosetting resin is applied in the insertion hole.

In a further aspect, the invention resides in a method of manufacturing an optical fiber sensor in which a plastic fiber for detection is inserted in an insertion hole of a molded member. A gap between the molded member and the plastic fiber for detection is filled by inserting the plastic fiber in the insertion hole after gel material is applied on the plastic fiber for detection.

In a further aspect, the invention resides in a method of an optical fiber sensor in which a plastic fiber for detection is inserted in an insertion hole of a molded member. After blowing up the insertion hole by compressed air and inserting the plastic fiber for detection therein in its state, the molded member is contacted to the plastic fiber for detection in a direction where load is applied by evacuating the compressed air.

In a further aspect, the invention resides in an optical fiber sensor for detecting the presence of the load applied to an optical fiber based on deformation of the optical fiber comprising an elongated molded member, an insertion hole penetrating the molded member in a long direction, and an optical fiber inserted in the insertion hole, wherein the inside diameter of the insertion hole is larger than the outside diameter of the optical fiber, and a filler is filled in a gap between the optical fiber and the molded member.

Preferably, the filler contains thermosetting resin or gel material.

More preferably, the invention further comprises an elongated stress-concentration plate for concentrating and applying stress to the optical fiber, arranged in contact with the optical fiber and in a long direction of the molded member and molded together with the molded member.

In a further aspect, the invention resides in a collision detection device installed in a part of a vehicle, for detecting the collision of the vehicle based on deformation of the optical fiber comprising an elongated molded member, an insertion hole penetrating the molded member in a long direction, an optical fiber inserted in the insertion hole, a light emitting element connected to one end of the optical fiber, which supplies a light signal to the optical fiber, a light receiving element connected to the other end of the optical fiber, which receives the light signal through the optical fiber, wherein inside diameter of the insertion hole is larger than the outside diameter of the optical fiber, and a filler is filled in a gap between the optical fiber and the molded member.

The following effects are achieved according to the present invention.

(1) The insertion efficiency of a plastic fiber can be improved.

(2) The risk of breakage of a molded member can be decreased.

(3) The operation of a sensor in the low load and the linearity of output of the sensor are improved.

DETAILED DESCRIPTION OF THE PREFERRED EMBODIMENTS

Before explaining a preferable embodiment of the present invention, a related optical fiber sensor will be explained again with reference to FIG. 10.

Figure 10:
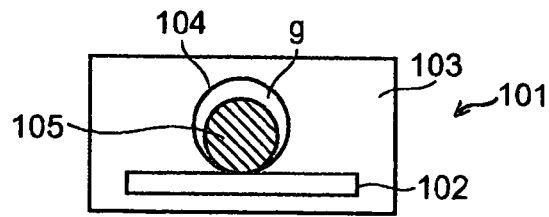
FIG. 10 is a cross-sectional view of a conventional optical fiber sensor.

In optical fiber sensor 101 shown in FIG. 10, stress-concentration plate 102 with press punched holes is molded with molded member 103, and plastic fiber (POF) 105 for detection is inserted in insertion hole 104 of molded member 103.

In a method of manufacturing optical fiber sensor 101, the compressed air is sent to insertion hole 104 of molded member 103, and POF 105 is inserted in the insertion hole 104 in its state, as is the case with the manufacturing method of FS sensor.

Because the thickness of molded member 103 is different according to the press-punched hole of stress concentration plate 102 in optical fiber sensor 101. The part where the wall thickness is especially thin swells when the compressed air is sent to insertion hole 104. Thus, a crack occurs in molded member 103 when the pressure of the compressed air is high, and in the worst case, the molded member breaks.

Further, only when POF 105 is inserted in insertion hole 104 having the outside diameter than that of POF 105, gap g is left between molded member 103 and POF 105. As a result, the load is not transferred to POF 105 until the load that crushes gap g is applied to optical fiber sensor 101. This causes the sensor not to function in the low load area, and deteriorates the linearity of a sensor output.

In consideration with the above-identified related art, preferable embodiments of the present invention will be explained with reference to attached drawings.

Figure 1:
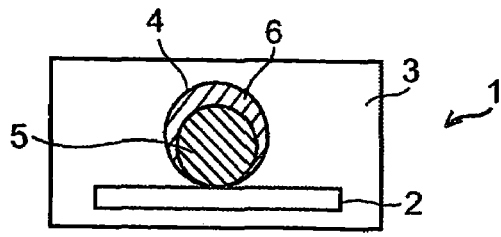
FIG. 1 is a cross-sectional view of an optical fiber sensor according to a first preferable embodiment of the present invention.

FIG. 1 is a cross-sectional view showing an optical fiber sensor according to a first preferable embodiment of the present invention.

In optical fiber sensor 1 according to a first embodiment as shown in FIG. 1, stress concentration plate 2 which has the press punched hole is molded with molded member 3. Plastic fiber (POF) 5 for load (impact) detection is inserted in insertion hole 4 of molded member 3, and Filler (gap material) 6 is filled in the gap between molded member 3 and POF 5.

Stress concentration plate 2 is formed like an elongated plate. Moreover, a plurality of press punched hole are formed at regular intervals along a long direction of stress concentration plate 2. Stress concentration plate 2 makes it easy for POF 5 to deform by concentrating and transferring the stress based on the load applied to sensor 1 through the press punched hole. The corrugated plate to which the corrugating process is applied may be used as stress concentration plate 2.

Molded member 3 consists of synthetic resin or synthetic rubber. Insertion hole 4 is formed along a long direction (a direction perpendicular to the paper of FIG. 1) of stress concentration plate 2 in molded member 3. After making molded member 3 by arranging a metal rod on stress concentration plate 2 along the long direction thereof and extruding them and molding material at the same time, insertion hole 4 is formed beforehand by pulling out the metal rod from molded member 3. A heat-resistant plastic fiber (HPOF) can be used as POF 5.

As filler 6, thermosetting resin such as an RTV rubber, or one which consists of gel (jellylike or gel) materials such as silicon grease, silicon oil compounds can be used. The one which consists of the same material as molded member 3 is the best for filler 6. However, because the material used is less than molded member 3, the rubber-like material is desirable for filler 6. Especially, because an RTV rubber is in liquid form before vulcanization, and therefore, good only in heating (not need to press), it is preferable as filler 6.

A method of manufacturing sensor 1 is explained with reference to FIG. 2.

Figure 2:
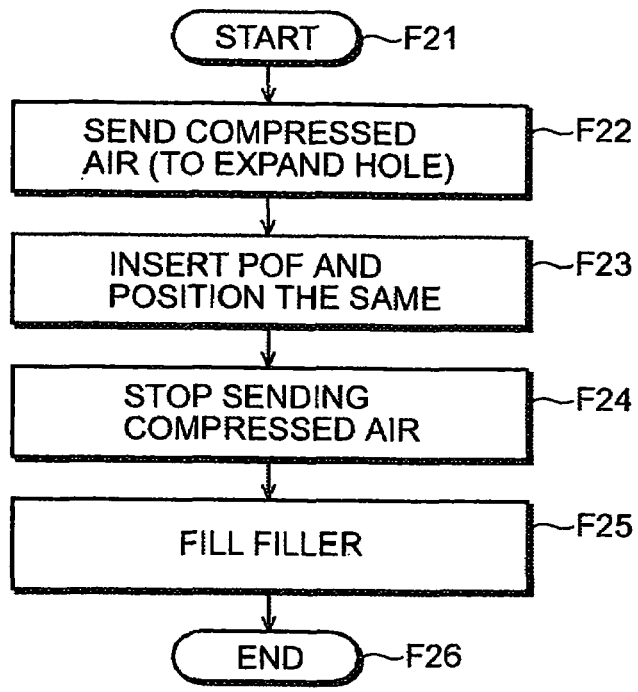
FIG. 2 is a flow chart illustrating a manufacturing method of the optical fiber sensor shown in FIG. 1.

The method starts with stress concentration plate 2 molded with molded member 3, and insertion hole 4 formed to molded member 3 beforehand as shown in FIG. 2 (F21). The compressed air is sent to insertion hole 4 to expand it (F22). POF 5 is inserted therein and positioned (F23). Then, the sending of the compressed air is ended (The compressed air is evacuated) (F24). After that, filler 6 is filled from one end of insertion hole 4 to a gap between molded member 3 and POF 5 (F25), and the processing is ended (F26).

Filler 6 can be easily filled in said gap by sucking air from the other end of insertion hole 4 and burying said gap when filler 6 is filled from one end of insertion hole 4 to said gap, and said gap can surely be filled. Further, said gap may be filled with filler 6 by press-fit. Sensor 1 of FIG. 1 is made as mentioned above.

The operation of the first embodiment will be explained next.

In sensor 1, POF 5 is pressed against the press punched hole of stress concentration plate 2 when the load (impact) is applied (downward from the upper side of sensor 1 in FIG. 1). As a result, the bend loss and the compression loss occur according to the load by the deformation of POF 5.

An amount of the bend loss or the compression loss is measured by observing the change (attenuation) in an amount of the transferred light propagating POF 5 by radiating light by a light emitting element from one end of POF 5 and receiving the light by a light receiving element at the other end thereof. The presence and the magnitude of the load applied to sensor 1 is detected from the measured loss amount.

It is possible to measure the change in an amount of light by receiving back scattered light and reflected light on an incidence edge of POF 5, or to measure not the change in the amount of light but the change in wave length of the incident light and the reflected light by forming an FBG (Fiber Bragg Grating) on POF 5 in advance.

Figure 3:
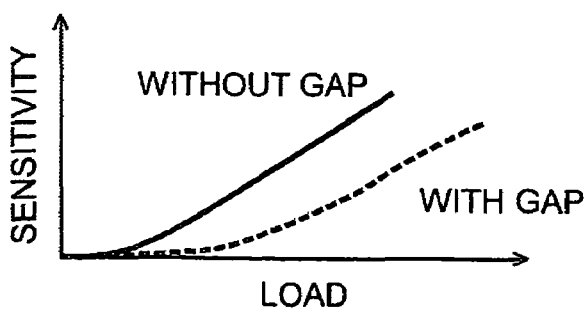
FIG. 3 is a schematic view showing an example of characteristics of load to sensitivity when there is a gap between a molded member and a plastic fiber for detection and when there is not.

Here, FIG. 3 shows characteristics of the load to the sensitivity in sensor 1 and sensor 101 of FIG. 10. In FIG. 3, the characteristic of sensor 1 (Without gap) is shown by a solid line and the characteristic of sensor 101 (With gap) is shown by a dotted line.

As shown in FIG. 3, the load effectively apply (transfer) to POF 5 even when the load applied to sensor 1 is low by filling filler 6 in the gap between molded member 3 and POF 5, and burying and losing the gap. Therefore, the sensitivity of sensor 1 is improved also in the low load area. Moreover, the linearity of the sensor output is also improved because the load is applied even in the low load area.

Gap g exists between molded member 103 and POF 105 in conventional sensor 101. Therefore, the load is not transferred to POF 10 until the load to break the gap g applies sensor 101. As a result, sensor 101 does not work in the low load area, and the linearity of the sensor output is also bad.

Moreover, in sensor 1, the efficiency (insertion characteristic) of the insertion of POF 5 to insertion hole 4 is improved because it is possible to enlarge insertion hole 4 more than the diameter (outside diameter) of POF 5. In this case, it does not need to swell molded member 3 by the compressed air.

Even when insertion hole 4 is swollen by the compressed air like the manufacturing method shown in FIG. 2, it is possible to apply the compressed air whose pressure cannot swell molded member 3. Therefore, molded member 3 can be prevented from swelling, cracking or rupturing.

A second embodiment will be explained next by referring to FIG. 4.

Figure 4:
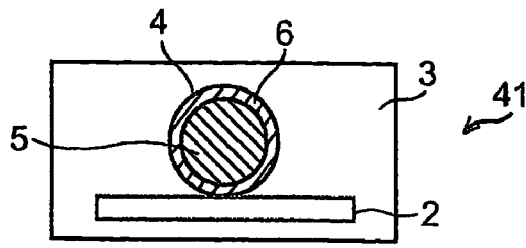
FIG. 4 is a cross-sectional view of an optical fiber sensor according to a second embodiment of the present invention.

While sensor 1 of FIG. 1 is made by filling filler 6 to the gap between molded member 3 and POF 5 after POF 5 is inserted in the insertion hole, optical fiber sensor 41 of FIG. 4 is made by inserting POF 5 in insertion hole 4 after filler is applied on POF 5, and burying said gap. Other configuration of sensor 41 is the same as sensor 1.

Figure 5:
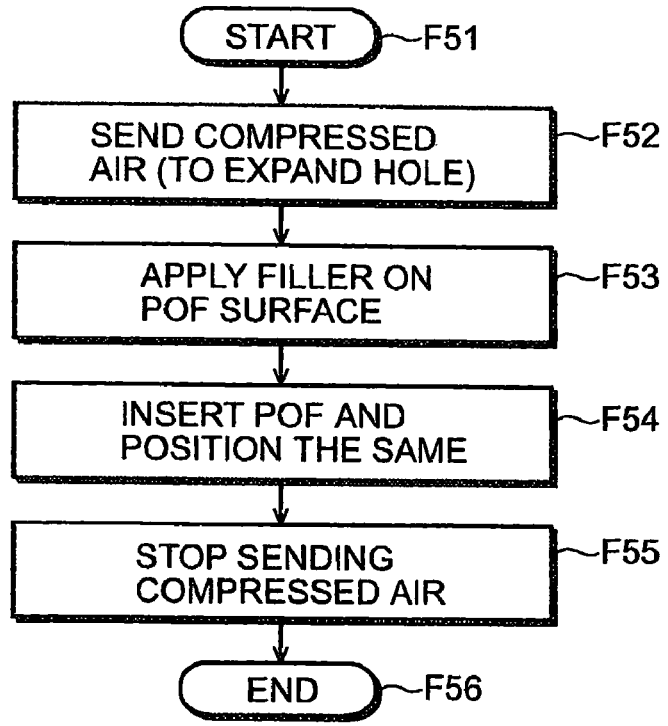
FIG. 5 is a flow chart illustrating a manufacturing method of the optical fiber sensor shown in FIG. 3.

A method of manufacturing sensor 41 will be explained with reference to FIG. 5.

At the start (F51), stress concentration plate 2 has been molded with molded member 3 as shown in FIG. 4, and insertion hole 4 has been formed in molded member 3 beforehand. First of all, the compressed air is sent to insertion hole 4, and insertion hole 4 is expanded (F52). While applying filler 6 on the surface of POF 5 in the state, or after filler 6 is applied on the surface of POF 5 beforehand in another process (F53), this is inserted in insertion hole 4 and POF 5 is settled (F54). Then, sending the compressed air is ended (F55), said gap are filled and the processing is ended (F56).

In case that thermosetting resin is used as filler 6, the resin is harden by heat further. Sensor 41 of FIG. 4 is made by doing as mentioned above. Sensor 41 has the same effects as sensor 1 of FIG. 1.

A third embodiment will be explained next.

Figure 6:
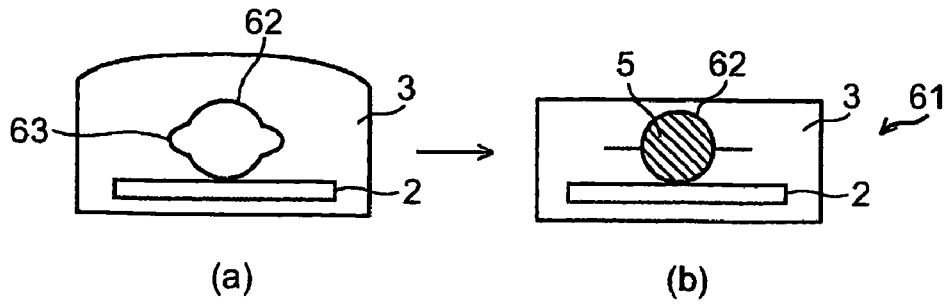
FIG. 6(a) is a cross-sectional view of an optical fiber sensor according to a third embodiment of the present invention under manufacturing.
FIG. 6(b) is a cross-sectional view of a finished product.

Optical fiber sensor 61 is made as shown in FIG. 6(*b*). The compressed air is sent to insertion hole 62, and insertion hole 62 is expanded as shown in FIG. 6(*a*). POF 5 is inserted in the insertion hole in the state. Then, the compressed air is evacuated, and molded member 3 and POF 5 are brought into full contact in a direction (vertical direction in FIG. 6(*b*)) where the load is applied. Other configuration of sensor 61 is the same as sensor 1 of FIG. 1.

More in detail, insertion hole 62 is formed roundly in section, that is smaller than the outside diameter of POF 5. Protruding slit 63 (fillet) is formed on both sides (right and left in FIG. 6(*a*)) along the overall length of the long direction of the insertion hole 62.

Figure 7:
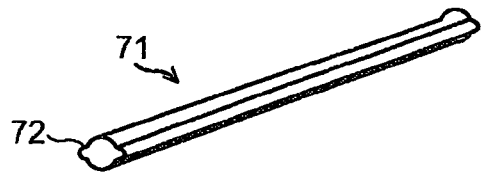
FIG. 7 is a perspective view of an irregular shaped metal rod used for a manufacturing method of the optical fiber sensor shown in FIG. 6(b).
Figure 8:
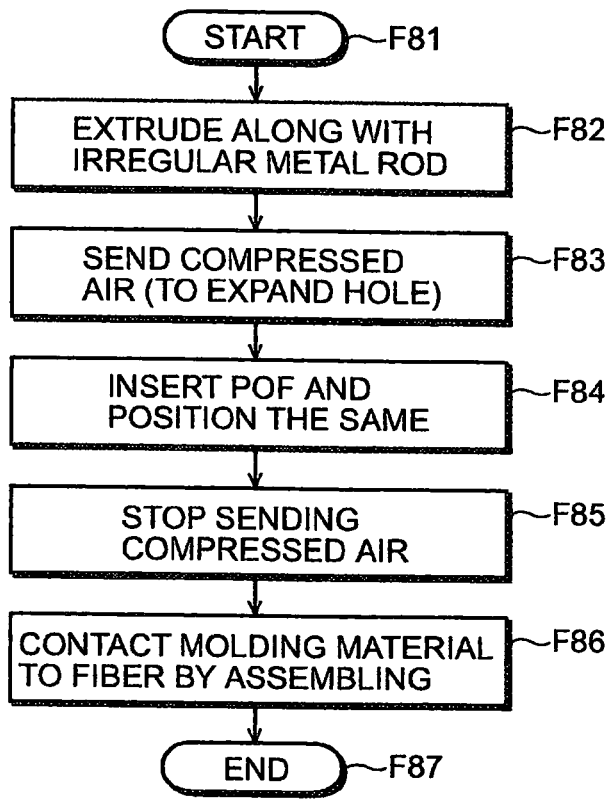
FIG. 8 is a flow chart illustrating of a manufacturing method of the optical fiber sensor shown in FIG. 6(b).

A method of manufacturing sensor 61 is explained by using FIG. 7 and FIG. 8.

Irregular shaped metal rod 71 shown in FIG. 7 before manufacturing sensor 61 is prepared. Irregular shaped metal rod 71 has protruding portion 72 raised on both sides along overall length of the long direction of the metal rod, of which section is round shape.

Irregular shaped metal rod 71 is prepared first as shown in FIG. 8 (F81). Irregular shaped metal rod 71 is arranged on stress concentration plate 2 along a long direction thereof. Molded member 3 is molded by pushing them and molding material out at the same time. Then, irregular shaped metal rod 71 is pulled out from molded member 3, and insertion hole 62 is formed (F82).

The compressed air is sent to insertion hole 62, and insertion hole 62 is expanded (F83). At this time, insertion hole 62 swells vertically easily because slit 63 is formed to insertion hole 62. Therefore, the insertion of POF 5 becomes easy, and the insertion characteristic of POF 5 is improved.

Under such a condition, POF 5 is inserted and settled (F84). The sending of the compressed air is stopped (F85). At this time, molded member 3 and POF 5 come in contact in a direction where the load is applied.

At this stage, slit 63 does not collapse, and remains as a gap between molded member 3 and POF 5. However, the above-mentioned gap is collapsed by settling sensor 61 at a fixed position, crushing slit 63 by the assembling pressure when the sensor is assembled, and contacting fully molded member 3 to the fiber (F86). The processing is ended (F87). Sensor 61 of FIG. 6(b) is obtained by doing as mentioned above.

Because insertion hole 62 is easy to swell by slit 63 though it is necessary to swell insertion hole 62 by the compressed air in sensor 61, the pressure of the compressed air can be suppressed to a lower value, and the swelling, the crack and the rupture of molded member 3 can be prevented. Other operations and effects of sensor 61 are the same as sensor 1 of FIG. 1.

Moreover, it is preferable that the shape of irregular shaped metal rod 71 of FIG. 7 is the shape that a gap between molded member 3 and POF 5 disappears when sensor 61 is finally assembled (slit 63 collapses). In this case, the load transfer to POF 5 can be excellently done by the load applied to molded member 3. However, it is not necessarily for slit 63 to collapse, but bring molded member 3 into contact with POF 5 in a direction where the load is applied at least.

A fourth embodiment will be explained with reference to FIG. 9.

Figure 9:
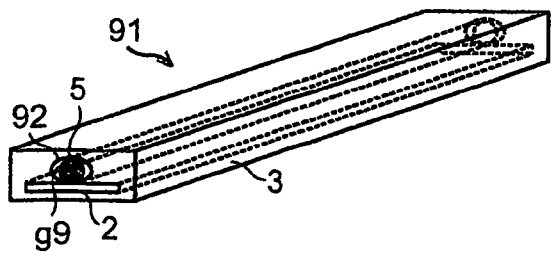
FIG. 9 is a perspective view of an optical fiber sensor according to a fourth embodiment of the present invention.

Optical fiber sensor 91 is an example of deformation of optical fiber sensor 61 of FIG. 6(b) as shown in FIG. 9. This sensor is made by forming elliptically the section of insertion hole 92 and bringing into contact at least in a direction (a vertical direction in FIG. 9) where load is applied. In the example of FIG. 9, stress concentration plate 2, POF 5, and molded member 3 are brought into contact in a direction where the load is applied.

More in detail, the section of insertion hole 92 is formed to oval shape of which minor axis is smaller than the outside diameter of POF 5, and the minor axis is arranged in a direction where the load is applied.

A method of manufacturing sensor 91 is the same as the manufacturing method explained in FIG. 8 excluding process F86 in which an irregular shaped metal rod of oval shape in section is used instead of irregular shaped metal rod 71 of FIG. 7.

In sensor 91, the minor axis of insertion hole 92 is arranged in a direction where the load is applied. Therefore, the minor axis side of insertion hole 92 with a thin molded member 3 swells vertically easily when the compressed air is sent to insertion hole 92. As a result, the insertion of POF 5 becomes easy, and the insertion characteristic of POF 5 is improved. Other effects and operations of sensor 91 are the same as sensor 61 of FIG. 6(b).

Moreover, it is possible to fill filler 6 of FIG. 1 in gap g9 between molded member 3 of sensor 91 and POF 5.

The optical fiber sensor according to each embodiment mentioned above can detect impulsive force when colliding by setting it up on the bumper of a vehicle. Preferably, the sensor is fixed in the route to which load transfers when the impact is applied, such as the surface of a bumper, the backside of the bumper, between a shock absorber (cushioning material) and the bumper, in the shock absorber, and between the shock absorber and the bumper lean force. It is possible to distinguish more efficiently a collision object because the height of the center of gravity of the collision object can be distinguished by installing sensors on the downside and the upside of a vehicle when setting them up at the position near the surface of the bumper.

It becomes possible to detect the collision from horizontal directions by installing the sensors not only on the bumper but also both sides of the vehicle such as doors, etc. It further becomes possible to detect the opening and shutting of the door if the sensors are provided on door confinement parts.

Measuring the weight of the axle of the passing vehicle becomes possible if the sensor is laid under a road because each optical fiber sensor explained in each embodiment mentioned above is a load sensor. Moreover, measuring the total weight of vehicles which pass through a bridge becomes possible, and thus deterioration of the bridge, etc. can also be estimated by installing sensors on bridge piers to measure the weight.

Further, the optical fiber sensor according to each embodiment mentioned above can be used as a pedestrian detection sensor by setting it up on the bumper of the vehicle.

For instance, to reduce pedestrian's injury when the collision with the pedestrian is detected with said optical fiber sensor, a bonnet is raised, or an air bag is inflated outside (upper side) of the bonnet. By raising the bonnet or inflating the air bag, the pedestrian's injury can be reduced when the pedestrian collides with the vehicle secondarily (Assumed that the collision with the bumper part is made as first collision).

It becomes possible to protect a pedestrian because a gap with an engine etc. in the bonnet increases if the bonnet is raised. However, when colliding with a hard object which does not need to protect, such as not a pedestrian but an electric pole, it is not necessary to make the bonnet raise. The reason is that it is not necessary to protect such a thing by raising the bonnet. For this, it is required to distinguish the hard object such as a utility pole from the pedestrian. This becomes possible by estimating the impact force at the collision. Moreover, it becomes possible to prevent the pedestrian from colliding directly with the vehicle secondarily by opening the air bag to hard parts such as a wiper, a pillar part, etc.

There is a vehicle which has a mechanism which reduces an impact force by making a wiper fixation part (support part) movable. The above-mentioned optical fiber sensor can be used as a trigger which makes the wiper fixation part movable only when the vehicle collides with a pedestrian, etc.

The impact force when the pedestrian knocks against the bonnet can be reduced by inflating the air bag under the bonnet (engine room side, inside) instead of inflating the air bag outside of the bonnet can be decreased. In this case, it is desirable to store the mechanism which inflates the air bag in the engine room side of the bonnet.

Although the present invention has been illustrated and described with respect to exemplary embodiment thereof, it should be understood by those skilled in the art that the foregoing and various other changes, omission and additions may be made therein and thereto, without departing from the spirit and scope of the present invention. Therefore, the present invention should not be understood as limited to the specific embodiment set out above but to include all possible embodiments which can be embodied within a scope encompassed and equivalent thereof with respect to the feature set out in the appended claims.

What is claimed is:

1. A method of manufacturing an optical fiber sensor in which a plastic fiber for detection is inserted in an insertion hole of a molded member, wherein after blowing up said insertion hole by compressed air and inserting said plastic fiber for detection therein in its state, said molded member is contacted to said plastic fiber for detection in a direction where load is applied by evacuating the compressed air.

* * * * *